United States Patent [19]

Bates

[11] Patent Number: 4,873,781
[45] Date of Patent: Oct. 17, 1989

[54] HIDDEN HOOK ARTIFICIAL LURE

[76] Inventor: Mitchell G. Bates, 908 Brooke Ct., Nixa, Mo. 65714

[21] Appl. No.: 215,569

[22] Filed: Jul. 6, 1988

[51] Int. Cl.[4] ............................................. A01K 83/00
[52] U.S. Cl. ........................................... 43/35; 43/37; 43/42.31
[58] Field of Search ..................... 43/35, 36, 37, 42.41, 43/42.31, 34

[56] References Cited

U.S. PATENT DOCUMENTS

| | | | |
|---|---|---|---|
| 1,670,174 | 5/1928 | Wiersma | 43/35 |
| 2,044,702 | 6/1936 | Kalyu . | |
| 2,463,978 | 3/1949 | Kunzelman . | |
| 2,474,481 | 6/1949 | Kleppen et al. | 43/37 |
| 2,597,832 | 5/1952 | Wolf | 43/37 |
| 2,748,520 | 6/1956 | Anderson | 43/42.1 |
| 3,059,371 | 10/1962 | Haynie, Sr. . | |
| 3,266,185 | 8/1966 | Abramson | 43/37 |
| 3,418,743 | 12/1968 | Haloorsen | 43/37 |

Primary Examiner—Nicholas P. Godici
Assistant Examiner—Karen Skillman
Attorney, Agent, or Firm—D. A. N. Chase; Joan Optican Herman

[57] ABSTRACT

AN artificial fishing lure having hidden hooks recessed within the body thereof to prevent snagging on weeds, rocks or the like when the lure is moved through the water. A trigger is provided and is attached at one end to a fishing line, and at a second end to a spring hook assembly. The spring hook assembly is formed from a single wire member, and has a medially positioned bite portion engaging said trigger assembly, and opposed ends respectively terminating in hook arms and hook ends. Snapping the fishing line activates the trigger assembly, which in turn activates the spring hook assembly, causing the hook arms to extend outwardly from the body of the fishing lure through longitudinal slits therein.

4 Claims, 1 Drawing Sheet

HIDDEN HOOK ARTIFICIAL LURE

BACKGROUND OF THE INVENTION

This invention relates to improvements in artificial fishing lures. This invention further relates to an artificial fishing lure which has hidden hooks and a trigger means to release the hooks in a predetermined manner.

Artificial fishing lures are widely varied in their operation as well as their appearance. Lures generally simulate forms of animal life in order to encourage fish to bite at the lure. However, the hooks of these lures often become entangled or snagged when vegetation, rocks or other obstructions are present in the water. Correspondingly, a wide variety of weedless lures have been developed in order to aid the fisherman when fishing in those areas where these obstructions might be present. These weedless lures have generally been complex in construction and are often difficult to use.

OBJECTS OF THE INVENTION

Accordingly, it is an important object of the present invention to provide an artificial fishing lure having one or more hooks concealed within the body thereof, which hooks extend outwardly in response to a trigger mechanism which can be activitated when a fish strikes.

It is a further important object of the present invention to provide an artificial lure as aforesaid which is simple in design, where the hooks are formed on the end portion of a spring contained within the lure.

It is still another important object of the present invention to provide an artificial lure as aforesaid which has an easily activated trigger mechanism that a fisherman can activate as soon as a fish strikes.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Figure 1:
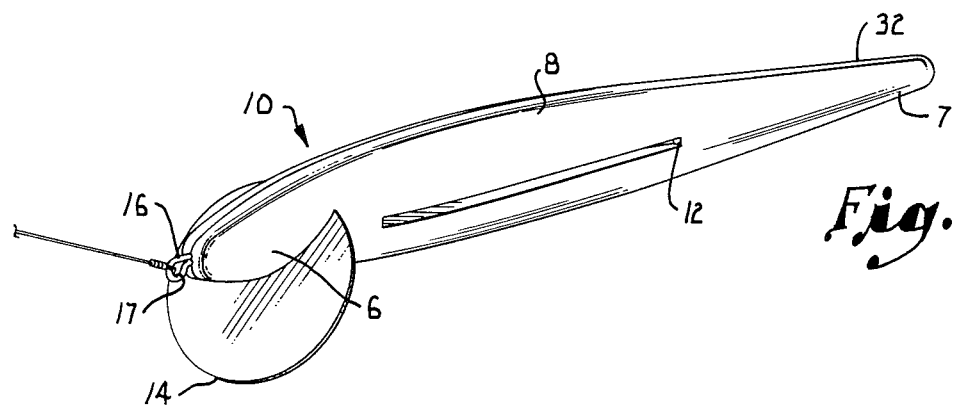
FIG. 1 is a perspective view of the artificial fishing lure of the present invention, showing the hooks in the retracted position, and illustrating the positioning of the lure on a fishing line.
Figure 2:
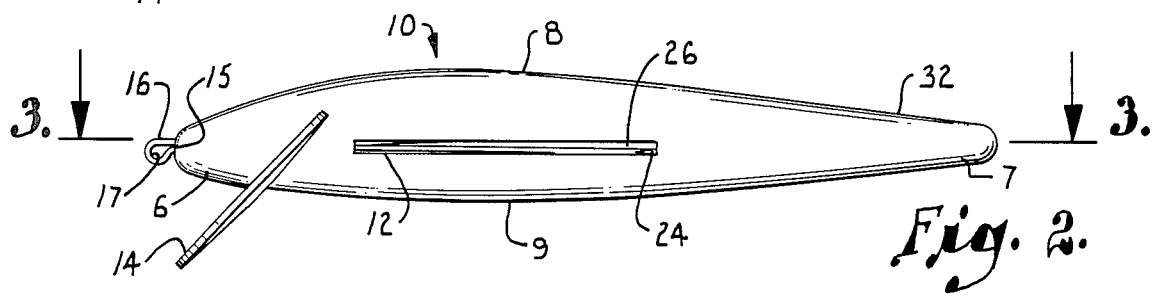
FIG. 2 is a side elevational view thereof.

Referring to the drawings, an artificial fishing lure is comprised of an elongated body, generally referred to as 10, having a nose end 6 and a tail end 7, and an upper surface 8 and a lower surface 9. The body is not limited to the elongated shape shown, but can be any desired shape. A pair of opposed elongated slits 12 and 13 extend along a partial length of each side thereof, and are positioned medially between said nose 6 and tail 7 ends.

The elongated slits 12 and 13, in another embodiment (not shown), extend along a partial length of the upper surface 8 and the lower surface 9. A bill 14 is provided adjacent nose end 6, and comprises a diving plane extending angularly downwardly therefrom.

Figure 3:
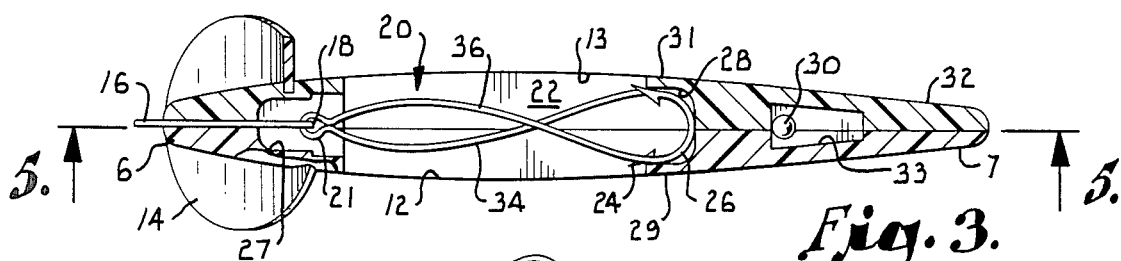
FIG. 3 is a longitudinal cross-section taken along line 3—3 of FIG. 2, showing the hooks in the retracted position.
Figure 4:
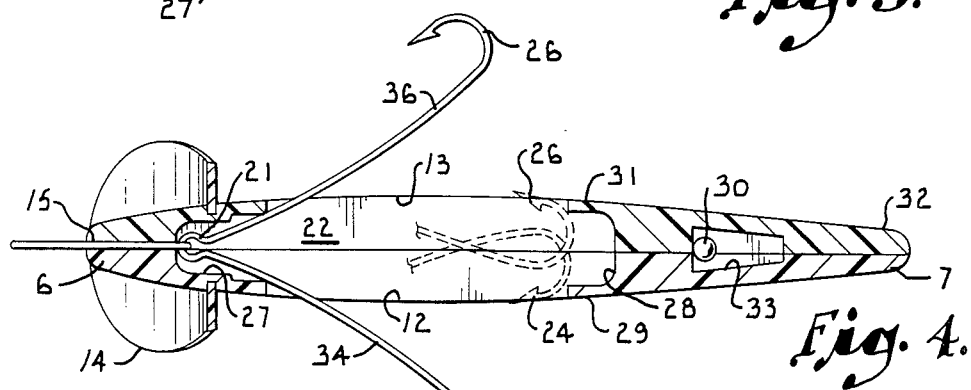
FIG. 4 is a longitudinal cross-section as in FIG. 3, showing the hooks in the extended position.

Spring hook assembly 20 is a single component having opposed arms 34 and 36, with respective barbed hook portions 24 and 26. Arms 34 and 36 are joined at a central bite 21. Trigger assembly 16 has a front eye 17 for attachment to a fishing line (not shown), and a rear eye 18 for attachment to the bite 21 of the spring hook assembly 20. Trigger 16 extends through channel 19, and protrudes from an opening 15 in the nose end 6 of the lure body 10. The trigger 16 may be selectively extended as shown in FIG. 4, or retracted as shown in FIG. 3. When retracted, a recurved portion 23 of the trigger 16 is held in place by engagement with abutment surface 38, which may be in the form of a wear pin.

A central body cavity 22 extends along a portion of the length of the lure body 10, and has a recess 27 located adjacent the nose end 6 for reciprocal sliding of the rear eye 18 of the trigger 16 attached to bite 21 of the spring assembly, and a recess 28 located adjacent the tail end 7. Recess 28 is defined by wall portions 29 and 31, and is of a transverse width substantially the same as the transverse width of hooks 24 and 26 for snugly accommodating the same therein. Walls 29 and 31 engage with hooks 24 and 26 to maintain the hooks 24 and 26 in an overlapping configuration within recess 28 when they are in a retracted position as shown in FIG. 3. When the hooks 24 and 26 are extended as shown in FIG. 4 and described in detail below, they are removed from the recess 28 and extend through slits 12 and 13 respectively.

Cavity 33 is provided adjacent tail end 7 of the lure body 10 for receiving a rattle 30 therein. The rattle 30 produces a noise which helps to attract the fish. Furthermore, the rattle 30 can double as a weight. The cavity 33 can be positioned at any point within the body, and is not limited to the tail end 7. This positioning can help to determine the attitude of the lure body 10, and the amount of weight can also be adjusted to raise or lower the depth of the lure in the water as desired.

Figure 5:
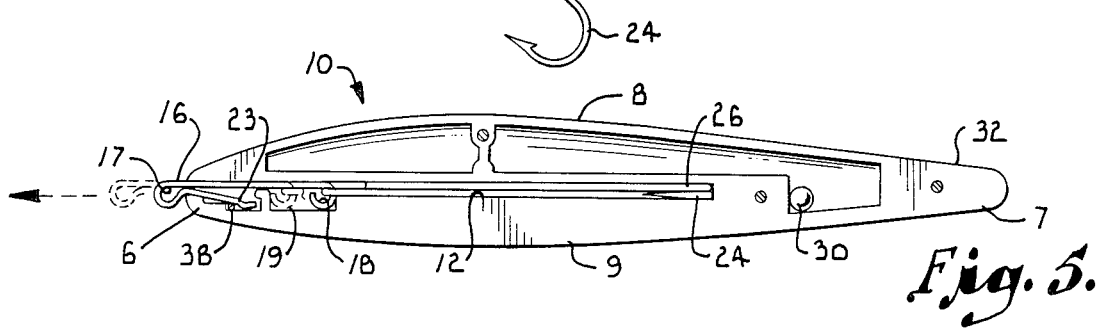
FIG. 5 is a side elevation view of another embodiment of the fishing lure of the present invention, showing the body of the lure as a clear material in order to illustrate the positioning of the components therein, with phantom lines depicting the extension of the trigger which is necessary to activate the hooks.

In use, the spring hook assembly 20 is in a retracted position, as seen clearly in FIG. 3, with the hooks 24 and 26 received within recess 28. A fishing line (not shown) is attached to front eye 17 of the trigger 16, and the lure is placed in the water. By snapping the fishing line forwardly, recurved portion 23 of the trigger 16 overcomes the resistance of the abutment surface 38, permitting the entire trigger 16 to be pulled outwardly as shown by phantom lines in FIG. 5. As the trigger assembly is pulled forwardly with respect to the lure body 10, the spring hook assembly 20 moves in response thereto, causing hooks 24 and 26 to move forwardly out of recess 38, as shown in FIG. 4. When hooks 24 and 26 are no longer engaged by walls 29 and 31, the arms 34 and 36 snap outwardly from the body 10 to their extended positions.

During operation, the lure can move through the water without being snagged by weeds, rocks, or the like, when the spring arms 34 and 36 are in their retracted position as shown by FIGS. 1-3 and 5. The fisherman will then wait until a fish has struck the lure, at which point he will snap the fishing line forwardly to activate the trigger assembly 16, which in turn activates the spring hook assembly 20 causing the arms 34 and 36 to extend outwardly and impale the barbed ends of hooks 24 and 26 within the fish.

The body 10 of the lure can be made of any suitable material, and is preferably a durable plastic. The spring hook 20 is generally a durable metal, but any suitable material may be employed herewith.

Having thus described the invention, what is claimed as new and desired to be secured by Letters Patent is:

1. An artificial fishing lure with hidden hooks comprising:
   a body having a nose and a tail portion, and a cavity therein, and having a recess adjacent said nose portion thereof and a recess adjacent said tail portion thereof, said tail recess having abutment walls;
   opposed elongated slits each positioned on an opposed side of said body medially positioned between said nose and said tail portions and extending longitudinally thereof;
   a spring hook assembly formed from a single member and having a medially positioned bite portion with opposed ends respectively terminating in hook arms and hook ends;
   a trigger assembly having a first eye protruding from said nose end for attachment to a fishing line and a second eye for engagement with said bite portion of said spring hook assembly;
   whereby said spring hook assembly is adapted to be selectively shifted between a retracted and an extended position in response to the movement of said trigger assembly, said hook ends being confined within said tail recess by said abutment walls when in said retracted position, and said hook arms and said hook ends advancing forwardly when said trigger is activated to extend outwardly through said slits.

2. The artificial fishing lure as set forth in claim 1, further comprising a rattle disposed adjacent said tail portion of said body.

3. A artificial fishing lure with hidden hooks comprising:
   a body having a nose and a tail portion, and a cavity therein, and having a recess adjacent said nose portion thereof and a recess adjacent said tail portion thereof, said tail recess having abutment walls;
   a pair of opposed elongated slits positioned respectively on an upper surface and a lower surface of said body medially positioned between said nose and said tail portions and extending longitudinally thereof;
   a spring hook assembly formed from a single member and having a medially positioned bit portion with opposed ends respectively terminating in hook arms and hook ends;
   a trigger assembly having a first eye protruding from said nose end for attachment to a fishing line and a second eye for engagement with said bite portion of said spring hook assembly;
   whereby said spring hook assembly is adapted to be selectively shifted between a retracted and an extended position in response to the movement of said trigger assembly, said hook ends being confined within said tail recess by said abutment walls when in said retracted position, and said hook arms and said hook ends advancing forwardly when said trigger is activated to extend outwardly through said slits.

4. The artificial fishing lure as set forth in claim 3, further comprising a weight disposed adjacent said tail portion of said body.

* * * * *